Sept. 4, 1934.    W. H. GITZEN    1,972,188
PREPARATION OF INSULATION
Filed Jan. 4, 1933
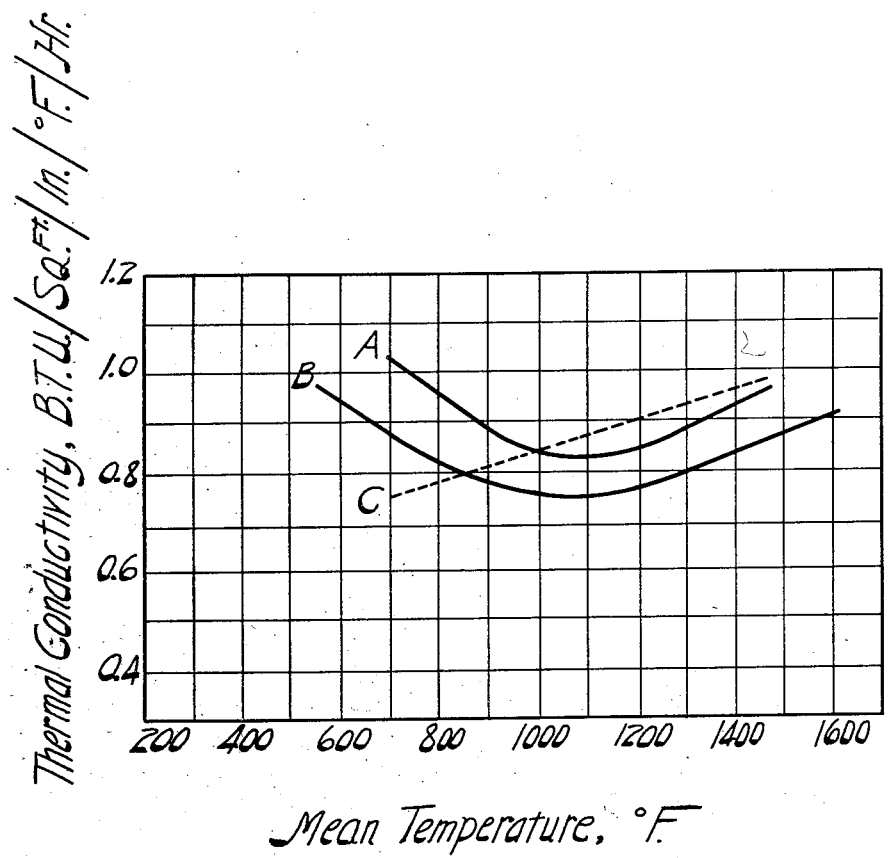
INVENTOR
WALTER H. GITZEN
BY
ATTORNEY Patented Sept. 4, 1934

1,972,188

UNITED STATES PATENT OFFICE 1,972,188

PREPARATION OF INSULATION

Walter H. Gitzen, East St. Louis, Ill., assignor to Aluminum Company of America, Pittsburgh, Pa., a corporation of Pennsylvania Application January 4, 1933, Serial No. 650,134

1 Claim. (Cl. 23—142)

This invention relates to heat insulators having uniform and improved insulating properties at elevated temperatures.

The invention specifically relates to methods of treating heat insulators comprising aluminum monohydrate or aluminum monohydrate and a bonding agent to obtain a final product which is characterized by stable and uniform heat insulation properties of improved value at elevated temperatures.

The invention has reference to that type of insulation material which is composed of or contains in substantial part aluminum monohydrate or, in other words, aluminum oxide which has been artificially produced in a finely divided substantially monohydrate form from aluminous material of higher hydration. While the invention is not limited to insulation material comprising this aluminum monohydrate as produced in any particular manner, the aluminum monohydrate may be made by the process disclosed in United States patent application Serial No. 133,518, filed September 3, 1925, by Martin Tosterud. According to that process ordinary aluminum trihydrate is digested with a solvent such as a solution of sodium hydroxide, the proportions used being such that the amount of solvent is insufficient to dissolve more than a small portion of the aluminum trihydrate. When this mixture is heated at temperatures between about 250 and 400° Fahrenheit under pressure there is produced a hydrated aluminum oxide which is in an extremely fine state of subdivision as a result of the abstraction of a portion of the combined water content of the aluminum trihydrate. The resulting material may contain some aluminum oxide in the monohydrate form, and is in a very finely divided state of subdivision rendering it light in weight or of low density. These physical characteristics contribute largely to the heat insulating properties of the material.

This aluminum monohydrate, either as such or in bonded form, is an excellent heat insulator. In its powdered form it may be packed between retaining walls or in similar structures to achieve an insulating structure. In its bonded form it may be used in the form of bricks or shapes. When in bonded form the insulator preferably contains not only the bonding agent and the aluminum monohydrate but likewise reinforcing and lightening material or materials such as asbestos fiber, bentonite, diatomaceous earth, etc., and porosity-forming materials such as saw dust, etc., as are later burned out on firing.

It is to these and similar aluminum monohydrate or aluminum monohydrate-containing heat insulators that this invention has reference. I have determined that in order to develop in such heat insulators their full heat insulation properties and in order to stabilize and produce therein uniform insulation characteristics, it is highly desirable and even necessary to preliminarily heat the insulator within a certain temperature range prior to use. This heating operation is not to be confused with the preliminary drying of the insulation for the purpose of removing physically retained water, which drying is carried out at ordinary steam temperatures, usually below about 300° Fahrenheit. The heating operation which I contemplate is one of removing, at relatively low temperatures, a substantial amount of the chemically combined water and this, as will hereinafter be explained, is accomplished between temperatures of 800° Fahrenheit and about 1400° Fahrenheit.

I have discovered that when heat insulation composed of aluminum monohydrate or containing substantial amounts of that material is heated over a range of, say, 200 to 1800° Fahrenheit, an unusual phenomenon, as measured by change in thermal conductivity, occurs. In order to fully explain this phenomenon, reference will be had to the accompanying drawing in which is illustrated to certain scale and in diagram form the change in thermal conductivity of a certain aluminum monohydrate insulator as it was heated from about 600 to about 1600° Fahrenheit. The solid line curves A and B represent the behavior of a bauxite which has been put in monohydrate form (i. e., the alumina contained therein is in monohydrate form) when heated through 600 to 1600° Fahrenheit; the temperatures are plotted on the abscissæ. On the ordinate the thermal conductivity is expressed in British thermal units per square foot per inch per degree Fahrenheit per hour. By following either curve A or curve B it will be noted that as the temperature increases, the thermal conductivity of the insulation falls materially to later increase as the temperature exceeds a certain value. This peculiar effect is apparently caused by a loss of chemically combined water. In other words the 1 molecule of water present in the monohydrated alumina is lost. This effect is present in the case of all insulation composed of or containing substantial amounts of aluminum monohydrate. Referring again to the drawing, curve C drawn in dotted line shows the result obtained when the material which was heated to obtain curve A is again heated. It will be noted that the thermal conductivity characteristic of the material is no longer uneven and the material now exhibits the normal and stable characteristics of a heat insulator showing, as it does, a steady and linear increase in thermal conductivity with increasing temperatures.

From a practical aspect the matters herein disclosed and upon which my invention is predicated are very important. It will be kept in mind that in ordinary use a heat insulating body is not uniformly heated, one side usually being hotter than the other. The result is, when aluminum monohydrate insulation is used, that the thermal conductivity of the material is uneven and unstable, difficult to predict definitely and, therefore, unsatisfactory. It is only by practicing the process of my invention and heating the insulating body to temperatures of 800 to 1400° Fahrenheit that it is possible to obtain a final insulating body of uniform, stable and, therefore, predictable thermal properties. Another outstanding advantage resulting from the practice of my invention is the increase in insulating value of the material. This may be readily seen from a comparison of the curves A and C as shown in the drawing. The monohydrated bauxite on which the experiments therein illustrated were performed has initially and at 700° Fahrenheit a thermal conductivity of somewhat over 1.0 British thermal units per square foot per inch per degree per hour while, after heating according to my invention, the thermal conductivity factor is about 0.75 (curve C). Thus a one-inch thickness of monohydrate insulation processed in accordance with my invention would have an insulating value equal to 1.33 inches of unprocessed material.

I claim:

The method of stabilizing and improving the thermal properties of insulation containing substantial amounts of artificially produced aluminum monohydrate comprising heating the insulation at temperatures between 800 to 1400° Fahrenheit.

WALTER H. GITZEN.